July 5, 1927.
T. HALL
1,634,663
SEARCHLIGHT
Filed Jan. 13, 1920
3 Sheets-Sheet 1
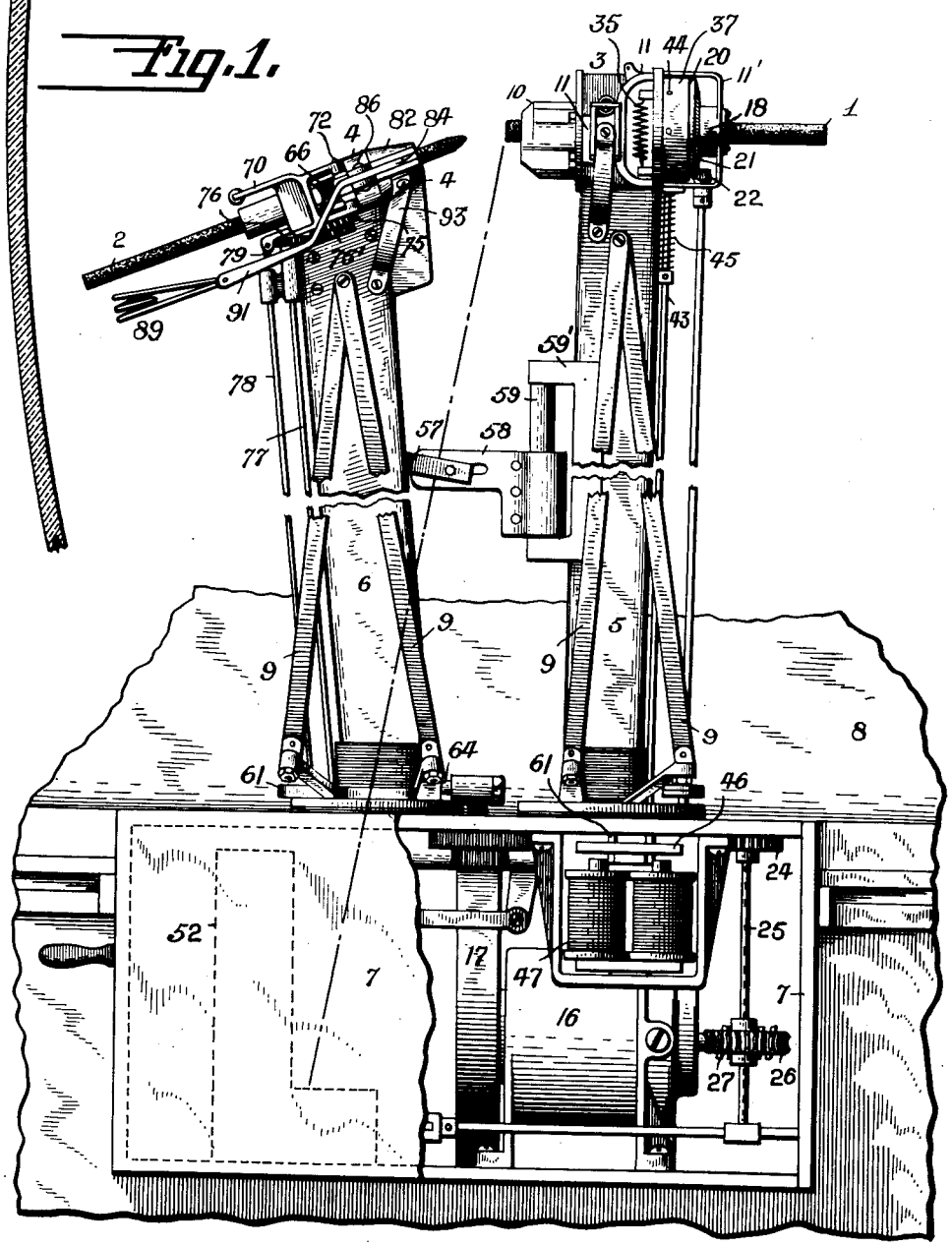
INVENTOR
THEODORE HALL
BY
Herbert H. Thompson
HIS ATTORNEY.

July 5, 1927.
T. HALL
SEARCHLIGHT
Filed Jan. 13, 1920
1,634,663
3 Sheets-Sheet 2
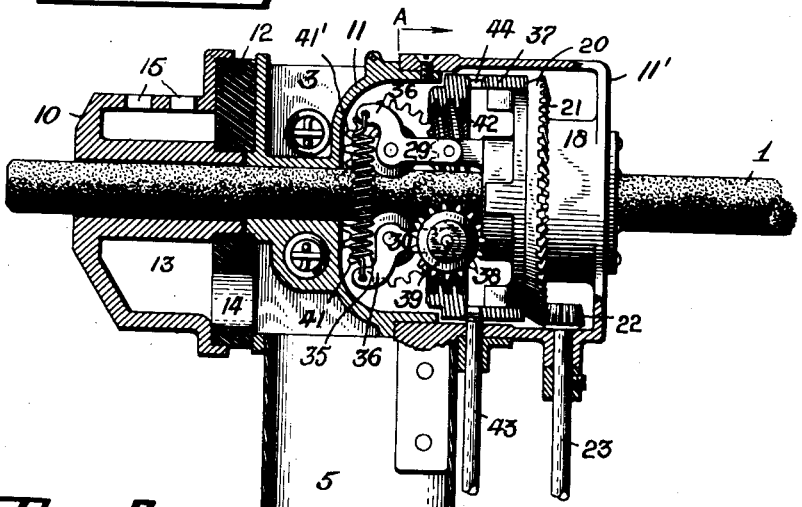
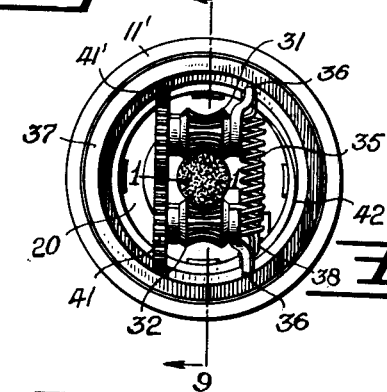
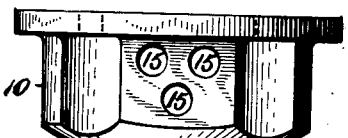
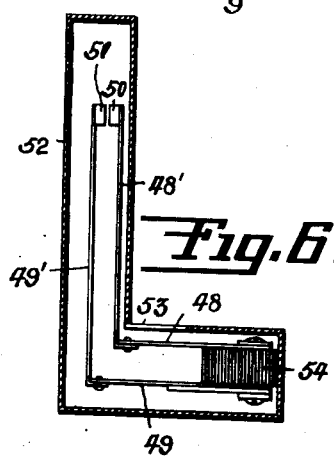
INVENTOR
THEODORE HALL
BY
Herbert H. Thompson
HIS ATTORNEY July 5, 1927.
T. HALL
1,634,663
SEARCHLIGHT
Filed Jan. 13, 1920
3 Sheets-Sheet 3
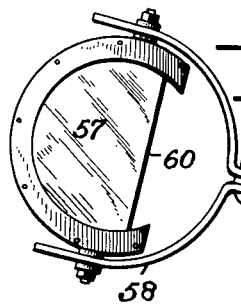
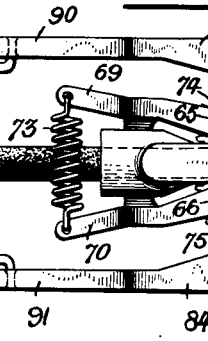
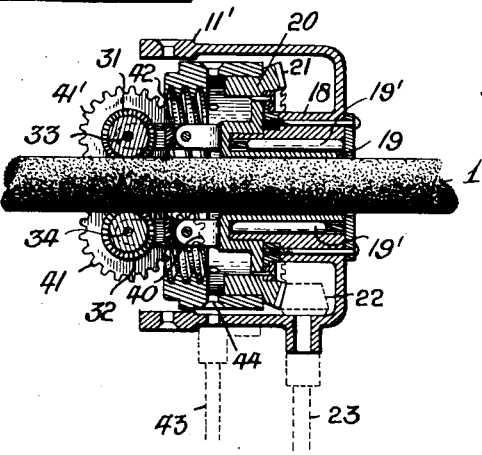
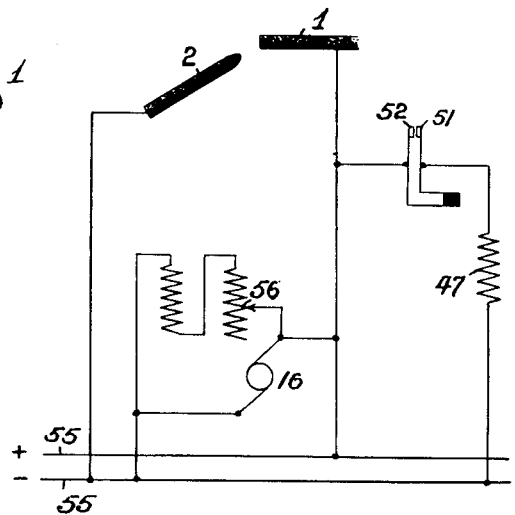
INVENTOR
THEODORE HALL
BY
Herbert H. Thompson
HIS ATTORNEY.

Patented July 5, 1927.

1,634,663

UNITED STATES PATENT OFFICE.

THEODORE HALL, OF BROOKLYN, NEW YORK, ASSIGNOR TO THE SPERRY GYROSCOPE COMPANY, OF BROOKLYN, NEW YORK, A CORPORATION OF NEW YORK.

SEARCHLIGHT.

Application filed January 13, 1920. Serial No. 351,099.

This invention relates to searchlights and has for its chief object the provision of means involving a minimum number of parts for securing a fine and accurate feed of the positive electrode in order to maintain the crater of said electrode more exactly at the focal point of a reflector. Previous devices of this type have involved mechanisms by which said electrode is fed step-by-step when its crater departs from said focal point, such, for example, as the star wheel type of feed, wherein the electrode is fed through the same distance each time that the star or other gear wheel makes a complete revolution about the axis of the electrode and strikes a stop rod movable into the path of said star wheel. In such mechanisms the distance through which the electrode is fed each time that the star wheel strikes the stop rod cannot be varied to any appreciable extent. Furthermore, such mechanisms frequently do not respond immediately to the departure of the crater of the electrode from the focal point of the reflector, since the star wheel strikes the movable rod only once at a predetermined point during a revolution. By means of my invention, however, the feeding of the electrode always takes place instantly upon the departure of the crater from said focal point and continues uninterrupted until the crater is again positioned at said point. The feed is hence continuous, highly accurate, and quickly responsive at all times to movement of the positive crater away from the focal point of the reflector and comprises a minimum number of parts for accurately positioning the crater at said point in a minimum time.

Another object of my invention is to provide an improved form of lens for concentrating radiations from the positive crater upon the thermostat in such form that a more regular and accurate action of the thermostat is secured.

Still another object is the construction of improved releasable members for gripping the negative electrode.

A further object of my invention is the provision of an improved type of thermostat and the location of said thermostat within the control box whereby the electrode feeding means and thermostat form a unit and the thermostat is protected from the elements.

Referring now to the drawings wherein I have shown what I now consider to be the preferred form of my invention:

Fig. 1 is a side elevation of searchlight apparatus equipped with my invention, parts being broken away and part of the reflector being shown in section.

Fig. 2 is a longitudinal sectional view through the positive electrode holder.

Fig. 3 is an end view of the feeding mechanism of Fig. 2, looking in the direction of arrow A.

Fig. 4 is a plan view of a detail.

Fig. 5 is a plan view of the base of the standard which supports the negative electrode.

Fig. 6 is a view of a thermostat.

Fig. 7 is a plan view of a lens shown in Fig. 1.

Fig. 8 is a plan view of the holder for the negative electrode.

Fig. 9 is a section taken on line 9—9 of Fig. 3 looking in the direction of the arrows.

Fig. 10 is a wiring diagram.

I have shown the positive electrode 1 and the negative electrode 2 mounted in electrode holders 3 and 4, respectively, supported by standards 5 and 6 from the control box 7 of the searchlight drum 8. Brace rods 9 may be provided between said standards and control box.

Holder 3 preferably comprises a forward portion 10 and portions 11 and 11' suitably secured together. Insulating material 12 may be interposed between the metallic sections 10 and 11 as shown. Nose cap 10 is provided with a longitudinal bore for the electrode and with an annular chamber 13 surrounding said bore and communicating through a passage 14 in insulation material 12 with the interior of standard 5. Apertures 15 in the top of portion 10 afford exits for air forced, in a manner well known in the art, by motor 16 and fan blower 17 through standard 5 and nose cap 10 and holder 11 to cool the electrode and holder. The insulated nose cap is especially adapted for effective cooling of the electrode and the prevention of undue spindling of the same. The cap extends to within a fairly short distance of the arcing end of the electrode as illustrated in Figs. 1 and 2, thus protecting the electrode from the oxidizing effects of circulating air. The cooled walls of the cap immediately surround the electrode but without touching the same, and rapidly absorb heat from the same by both radiation and convection currents of the dead air between the electrode and the said walls. By interposing the insulation 12, I am enabled to make the holder 10 of a metallic substance of great heat conducting properties and at the same time avoid the possibility of the arc striking over to the holder, as would occur were a metallic shield grounded to the positive carbon, placed near the arc. Supported by holder portions 11 and 11' is the mechanism for rotating and feeding the positive electrode, which may be constructed substantially as follows:

Journalled in a sleeve 18 projecting inwardly from holder portion 11' is the stem 19 of a rotatable member 20. Suitable antifriction bearings 19' may be interposed between said sleeve and stem. Said stem, as shown, is provided with an axial bore for the electrode, as is also the holder portion 11. Member 20 may be rotated continuously in any suitable manner by motor 16, for which purpose I have shown a crown gear 21, on the outer face of member 20, meshing with a bevel gear 22 on a shaft 23. The latter may be driven through a suitable train of gears (not shown) from gear 24 on the same shaft 25 as worm wheel 26, driven by a worm 27 on the motor shaft. Pivotally carried by member 20 are pairs of arms 29 and 30 which carry feed rollers 31 and 32 mounted therein on rotatable shafts 33, and 34, respectively. A spring 35, connected at its ends to extensions 36 of said arms, causes rollers 31 and 32 to grip the electrode firmly on opposite sides thereof as shown. It is thus evident that, during rotation of member 20, the electrode 1 is constantly rotated about its own axis. For imparting an axial movement to the electrode I have provided means for rotating the feed rollers about their own axes.

Supported adjacent gear 21 on member 20 is a revoluble nut member 37 provided with an internal thread 42 with which thread a gear wheel 38 rotatable with shaft 39 engages. Said shaft 39 serves to pivotally connect arm 30 to member 20. Sufficient friction may be provided between members 20 and 37 so that member 37 normally rotates with member 20. At the opposite end of shaft 39 is a pinion 40 rotatable with said shaft and meshing with a gear 41 on feed roller shaft 34. The latter gear meshes with a similar gear 41' fixed to shaft 33. Consequently, rotation of gear wheel 38 about its axis will cause rotation of shafts 33 and 34 and of the feed rollers carried thereby to move the electrode axially. For causing rotation of gear wheel 38 I have provided means for preventing rotation of nut 37, whereby relative rotation between member 20 and said nut takes place. It will readily be seen that, when rotation of nut 37 is stopped, gear 38 will be carried by member 20 about the axis of the positive electrode and will be rotated about its own axis through the engagement of its teeth with the threads of the nut.

For preventing rotation of nut 37 I have shown a rod 43 movable into engagement with any of a series of holes 44 in the periphery of member 37. Said rod is shown as slidable through an aperture in the bottom of holder 11 and may be normally pressed by a spring 45 into position permitting rotation of nut 37 with member 20. The lower end of rod 43 may rest upon one end of an armature 46 of an electromagnet 47, said armature being suitably pivoted in bearings 61. Thus, when the armature is retracted, rod 43 will be moved into engagement with one of holes 44 to stop rotation of member 37. The number of holes 44 may obviously be varied as desired.

The energization of magnet 47 may be accomplished by the closing of a circuit through the medium of a thermostat upon the displacement of the crater of the positive electrode from the focal point of the mirror. One form of thermostat is shown in Fig. 6, wherein a pair of sensitive thermostatic strips 48 and 49 are insulated from each other at 54 and are attached at their free ends to suitable strips 48' and 49' which carry at their free ends contacts 50 and 51. Said sensitive strips 48 and 49 are each composed of a pair of metals having different coefficients of linear expansion so that upon a rise in temperature each strip will buckle and tilt the contact connected to it. Thus, when the temperature of the surrounding medium rises, each strip will buckle and contacts 50 and 51 will hence be tilted in the same direction so that no circuit will be closed. Upon the falling of rays from the positive crater, however, through aperture 53 of casing 52 and upon strip 48, strip 49 being shielded from said rays by strip 48, the latter strip will buckle more rapidly than strip 49 and will bring contact 50 into engagement with contact 51, thereby closing a circuit through electromagnet 47. Thus the thermostatic circuit closer is not responsive to a rise in temperature of the surrounding medium and acts only in response to radiations from the positive crater falling thereon. The thermostat per se, however, is not claimed herein, but is covered in the patent to A. P. Davis 1,433,073, October 24, 1922, and in the copending application of M. L. Patterson Serial No. 513,149 filed November 5, 1921, both of which are assigned to the assignee of this invention. As shown in Fig. 10 magnet 47 is connected in series with contacts 51 and 52 across mains 55. Motor 16 is shown as shunt wound and as connected across the mains and may be provided with a field rheostat 56 for varying its speed.

In Fig. 1 I have shown in dotted lines the thermostat located within the control box 7, with its aperture 53 in the path of rays from the positive crater when the crater departs from the focal point of the reflector. Said rays are concentrated upon said aperture through the medium of a suitable lens 57, preferably adjustable in a bracket 58, the latter being slidably mounted on a rod 59 in a second bracket 59' secured to standard 5. In Fig. 1 the dot and dash line indicates the path of a ray from the positive crater passing through lens 57 and falling upon the thermostat. While any conventional type of lens may be used to concentrate radiations from the positive crater upon the thermostat aperture, I have found a lens having a straight line edge 60 particularly useful. This lens, when placed at less than its focal distance from the crater and with the straight edge substantially at right angles to the direction of feed of the electrode and facing the same, (Fig. 7), serves to concenthe direction of feed of the electrode and thermostat in the form of a well defined spot. It is found that, when a lens of the usual type, having an edge entirely circular is used the spot of concentrated light is surrounded by fringes of light of lesser intensity, which fringes strike the thermostat aperture 53 before the spot of concentrated radiations. By utilizing a type of lens as shown in Fig. 7, however, the edge of the light spot which moves toward the thermostat aperture as the positive crater moves away from the focal point of the reflector is sharp and well defined, with the result that the thermostat element 48 is not affected by any fringes and operates to close the circuit only at the instant when the spot of concentrated light falls upon it. A more regular and accurate action of the thermostat may thus be secured.

By mounting the thermostat within the control box not only is it protected against atmospheric conditions, but also a unitary structure comprising the thermostat and electrode feeding means is secured. In prior devices the thermostat has been located on the outside of the search-light drum. In such position, however, the thermostat is exposed to the varying conditions of the atmosphere, and furthermore inconvenience in testing the operation of the thermostat is caused for the reason that the electrodes and feeding mechanism must be assembled in the drum before testing can take place. In the structure which I have provided, however, the thermostat, electrodes, electrode feeding means, and control box all form a unit whereby the operation of the thermostat and feeding means can be tested without assembling the parts in the searchlight drum. At the same time the action of the thermostat is independent of heat of conduction or convection and is responsive only to heat radiated from the positive crater.

The standard 6, upon which the negative electrode 2 is mounted, may be rotatable about a vertical axis in order to facilitate removing and replacing of the electrode. As shown in Fig. 5, the base 61 of standard 6 is provided with arcuate slots 62 through which may extend bolts or pins 63 which serve to secure said base to the control box 7. At the same time, rotation of the standard and base about a vertical axis is permitted by slots 62. A spring pressed plunger 64 mounted on control box 7 may be provided to engage normally with a surface 65 of projection 66 on base 61 to maintain said standard in its normal position. The edge 65 of lug 66 with which plunger 64 engages is preferably inclined so that base 61 can be readily turned by the exertion of sufficient force and plunger 64 thereby forced back against the action of its spring.

The feeding of the negative electrode may be accomplished by conventional means controlled by the length of the arc and forms no part of my invention. I have shown, in Figs. 1 and 8, feed rollers 65, 66 for gripping the negative electrode, said rollers being rotatable with shafts 67, 68, mounted in arms 69, 70, respectively. One end of each arm is pivoted at 71, 72 to the electrode holder 4, and the free ends of said arms are normally pulled toward each other by a spring 73. Rollers 65, 66 are thus pressed firmly into contact with the electrode. Intermeshing gears 74, 75 on shafts 67, 68 are adapted to be driven by gear 76 on shaft 77, said gear 76 meshing with a gear 75' fixed on the same shaft as gear 75. Thus rotation of the feed rollers to feed the electrode through the holder 4 is caused. Rotation of shaft 77 may be accomplished by any conventional means controlled by the length of the arc.

Preferably means should be provided for automatically separating the feed rollers 65 and 66 when the standard 6 is turned. For this purpose a slidable rod 78 may be connected at one end with the lower ends of arms 69, 70 in any suitable manner as by links, one of which is shown at 79, for spreading said arms when said rod is raised. Raising of said rod may be accomplished automatically when standard 6 is turned, through the medium of an inclined surface 80 upon which rests the lower end of the rod. This means for automatically separating the feed rollers forms no part of my invention and I lay no claim thereto.

Slidably fitting at their bases in one end of holder 4 is a pair of cooperating brush members 81 and 82 provided with grooves on their adjacent faces for receiving the electrode therebetween. Jaws 83 and 84, pivoted to holder 4 at points 85 and 86, respectively, are provided at one end with projections 87 and 88 adapted to engage corresponding apertures in members 81 and 82. At the other end of said jaws is a looped spring member 89 which is connected to each jaw and serves to force the forward ends of said jaws together to cause the members 81 and 82 to firmly engage the electrode. It will be understood, however, that the electrode 2 is not gripped so tightly by members 81 and 82 as to preclude movement of said electrode axially through said members in response to rotation of rollers 65 and 66. For releasing the members 81 and 82 ends 90 and 91 of jaws 81 and 82 may be pressed toward each other, thereby removing projections 85 and 86 from engagement with said members, whereupon said members may be readily removed from holder 4. I have shown resilient member 89 extending a considerable distance behind the rear ends of jaws 83 and 84, so that the intense heat of the arc will have a minimum effect upon the resiliency of said member.

Brush members 81 and 82 thus contact firmly with the electrode and may be utilized as current conductors and to this end I have shown a conducting strip 93 connecting member 82 with standard 6, the current passing from electrode 2, through standard 6, and back to the negative main. Of course if desired, another similar contact strip may be secured to standard 6 and brush 81.

It should be particularly noted that brushes 81 and 82 are located adjacent the arcing end of the electrode to minimize the $RI^2$ losses incident to the passage of the current, and that, at the same time, the resilient member which causes the brushes to grip the electrode tightly is located behind the electrode and at a considerable distance from the arc.

The operation of my invention will be evident from the foregoing description. As soon as the current is turned on motor 16 will be energized to rotate continuously the positive electrode. The arc may be struck by any conventional means, which forms no part of my invention. Should the crater of the positive electrode be out of or depart from the focal point of the reflector, the thermostatic circuit closer 48, 49 will complete a circuit through magnet 47, which will attract armature 46 to move rod 43 into engagement with one of apertures 44 in member 37. Rotation of threads 42 having been stopped and the rotation of member 20 continuing, gear 38 will be rotated about its own axis to cause axial movement of the positive electrode through holder 3 and bring the crater back into the focal point of the reflector. A departure of said crater from the focal point results in instant operation of the feeding mechanism, which ceases at the instant when the crater is brought back to said point. The action of the thermostat is made more accurate and regular by the employment of the type of lens above described. At the same time current conducting brushes 81 and 82 are caused to grip the negative electrode firmly and may be readily released by pressing ends 90 and 91 of jaws 83 and 84 together, whereupon said brushes may be withdrawn from holder 4 and renewed if desired.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a searchlight, the combination with an electrode holder, of a member rotatable thereon, a threaded member concentric to and normally rotatable with said rotatable member, means for intermittently preventing rotation of said threaded member, a feed roller carried by said rotatable member, and means operable by relative rotation of said members for rotating said roller to feed said electrode axially.

2. In a searchlight, the combination of an electrode holder, a pair of feed rollers adapted to grip an electrode, means for rotating said rollers about the axis of said electrode, and means including a threaded member concentric with and rotatable about the axis of said electrode for rotating said rollers about their own axes for feeding said electrode through said holder.

3. In a searchlight, the combination with an electrode holder, of a rotatable member supported thereon, a threaded member concentric with said rotatable member and normally rotatable with the same, means for preventing rotation of said threaded member, and means actuated by relative rotation of said members for feeding an electrode axially.

4. In a searchlight, the combination with an electrode holder, of means for feeding an electrode through said holder, said means including a normally rotatable, internally threaded member, and means for preventing rotation thereof to feed the electrode.

5. In a searchlight, the combination with an electrode holder, of a member rotatable about the axis of the electrode, a gear on said member revoluble about the axis of an electrode, a threaded member meshing with said gear and normally rotatable about said axis, means for preventing rotation of said threaded member during revolution of said gear about said electrode axis, and means controlled by rotation of said gear about its own axis for feeding said electrode through said holder.

6. In combination with a projector including a source of light, means including a thermostatic circuit closer for maintaining said source in a predetermined position, and means comprising a lens with a straight edge for concentrating rays from said source upon said circuit closer said lens being positioned with its straight edge substantially at right angles to the direction of movement of the light source.

7. In a searchlight, the combination with the searchlight drum, of a pair of electrode holders, a control box by which said holders are removably supported in said drum, electrically actuated means carried by said box for feeding an electrode through one of said holders, and a light responsive thermostatic circuit closer carried by said box for controlling the action of said means.

8. In a searchlight, the combination with the searchlight drum, of an electrode holder, a control box by which said holder is removably supported in said drum, electrically actuated means carried by said box for feeding an electrode through said holder, a light responsive thermostatic circuit closer within said box for controlling the action of said means and means also carried by said box for directing a beam from the arc on said circuit closer when the electrode is in a predetermined position.

9. In light projecting apparatus, a projector, an electrode holder mounted for adjustment with respect thereto, a control box, a thermostat in said box, means controlled by said thermostat for feeding a positive electrode through said holder, and means for directing a beam of light from the crater of said positive electrode upon said thermostat, said thermostat and light directing means being connected to move with said holder, whereby adjustment of the position of said holder will not vary the effect of said beam upon said thermostat.

In testimony whereof I have affixed my signature.

THEODORE HALL.